(12) United States Patent
Goeb et al.

(10) Patent No.: US 6,340,719 B1
(45) Date of Patent: Jan. 22, 2002

(54) CROSSLINKING PROCESS

(75) Inventors: Siegfried R. Goeb, Willich; Andreas H. Graichen, Hilden, both of (DE)

(73) Assignee: 3M-Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/474,532

(22) Filed: Dec. 29, 1999

(51) Int. Cl.[7] .................................................. C08F 2/46
(52) U.S. Cl. ...................... 522/174; 522/173; 522/182; 522/183; 522/90; 528/341; 528/75; 428/343; 428/345; 428/355 AC; 428/355 N
(58) Field of Search ............................... 427/54.1, 508, 427/516, 532, 533, 557; 522/182, 90, 96, 183, 174, 173, 153, 134, 136, 139, 140; 528/75; 525/341; 428/343, 345, 355 AC, 355 N (56) References Cited

U.S. PATENT DOCUMENTS

| | | | |
|---|---|---|---|
| 4,181,752 A | 1/1980 | Martens et al. | 427/54.1 |
| 4,214,061 A * | 7/1980 | Lee | 525/455 |
| 4,223,067 A | 9/1980 | Levens | 428/308 |
| 4,415,615 A | 11/1983 | Esmay et al. | 428/40 |
| 4,524,104 A * | 6/1985 | Hagio et al. | 428/341 |
| 4,710,536 A | 12/1987 | Klingen et al. | 524/493 |
| 4,812,541 A | 3/1989 | Mallya et al. | 526/264 |
| 4,833,179 A | 5/1989 | Young et al. | 522/183 |
| 4,855,170 A | 8/1989 | Darvell et al. | 428/40 |
| 4,908,229 A | 3/1990 | Kissel | 427/54.1 |
| 4,952,650 A | 8/1990 | Young et al. | 526/194 |
| 4,961,960 A * | 10/1990 | Iimure | 427/54.1 |
| 5,116,930 A | 5/1992 | Yabuta et al. | 528/45 |
| 5,122,567 A | 6/1992 | Spada et al. | 524/818 |
| 5,252,689 A | 10/1993 | Lucas et al. | 526/227 |
| 5,274,063 A | 12/1993 | Matsumoto et al. | 526/320 |
| 5,350,823 A | 9/1994 | Haeberie et al. | 526/301 |
| 5,391,406 A | 2/1995 | Ramharack et al. | 427/516 |
| 5,395,892 A | 3/1995 | Haeberle et al. | 525/217 |
| 5,418,288 A | 5/1995 | Kawasaki et al. | 525/71 |
| 5,633,317 A | 5/1997 | Kawasaki et al. | 525/66 |
| 5,637,646 A | 6/1997 | Ellis | 525/309 |
| 5,648,425 A | 7/1997 | Everaerts et al. | 515/100 |
| 5,695,837 A | 12/1997 | Everaerts et al. | 428/40.1 |
| 5,741,543 A | 4/1998 | Winslow et al. | 427/208.4 |
| 5,773,485 A | 6/1998 | Bennett et al. | 522/8 |
| 5,804,610 A * | 9/1998 | Hamer et al. | 522/182 |
| 5,824,743 A | 10/1998 | Krawczyk et al. | 525/127 |
| 5,840,783 A | 11/1998 | Momchilovich et al. | 522/412 |
| 5,861,211 A | 1/1999 | Thakkar et al. | 428/343 |
| 5,877,261 A | 3/1999 | Harder et al. | 525/123 |
| 5,905,099 A | 5/1999 | Everaerts et al. | 522/126 |
| 5,932,298 A | 8/1999 | Moon | 427/496 |

FOREIGN PATENT DOCUMENTS

| | | | |
|---|---|---|---|
| DE | 42 37 030 A1 | 5/1994 | C08F/246/00 |
| JP | 8-48939 | 3/1999 | C09D/175/04 |
| WO | WO 92/07823 | 5/1992 | C07C/271/60 |
| WO | WO 93/16131 | 8/1993 | C08K/5/07 |

OTHER PUBLICATIONS

*English Language Abstract.
Lucas et al., "Preparation and Properties of Blocked Dimethyl m-Isopropenyl Benzyl Isocyanate for One-Component Coatings," Journal of Coatings Technology, vol. 65, No. 820, pp. 59–66, May, 1993.

* cited by examiner

Primary Examiner—James J. Seidleck
Assistant Examiner—Sanza L. McClendon
(74) Attorney, Agent, or Firm—Lucy C. Weiss (57) ABSTRACT

A process for crosslinking a melt-processed polymer composition comprises the steps of (a) forming a polymerizable mixture comprising (i) at least one monoethylenically-unsaturated monomer or prepolymer and (ii) at least one monoethylenically-unsaturated, blocked mono- or polyisocyanate that is thermally stable at a selected melt processing temperature range and that is thermally deblockable at and above a deblocking temperature that is higher than the selected melt processing temperature range; (b) exposing the polymerizable mixture to transmissive energy to polymerize the mixture to form a polymer composition comprising polymerized units derived from the blocked mono- or polyisocyanate; (c) melt processing the polymer composition at the selected melt processing temperature range to form a melt-processed polymer composition; and (d) during melt processing or thereafter, increasing the temperature of the melt-processed polymer composition to the deblocking temperatures in the presence of at least one isocyanate-reactive crosslinking agent, to effect crosslinking of the melt-processed polymer composition.

32 Claims, 2 Drawing Sheets

CROSSLINKING PROCESS

FIELD OF THE INVENTION

This invention relates to processes for crosslinking melt-processed polymer compositions and to compositions crosslinkable thereby.

BACKGROUND OF THE INVENTION

To avoid environmental pollution, manufacturing processes that do not require the use of volatile solvents have become of great interest. Hot-melt coating techniques have developed in response to this need. Unlike solvent coating techniques, where a polymer composition is simultaneously coated and crosslinked, hot-melt coating requires that coating and crosslinking be performed sequentially. This requirement is due to competing considerations, as a polymer composition that is already crosslinked cannot be hot-melt coated effectively, yet a polymer composition needs to be crosslinked in order to achieve certain desirable performance characteristics (for example, high peel and shear adhesion characteristics, if the polymer composition is a pressure-sensitive adhesive (PSA) composition). Thus, hot-melt coating is performed first, followed by crosslinking of the resulting coated polymer composition.

Since hot-melt coating involves the use of large amounts of thermal energy and shear, thermal crosslinking techniques (for example, using non-copolymerized blocked isocyanates) have generally not been sufficiently controllable to achieve wide use, and thus non-thermal crosslinking techniques have generally been utilized. The traditional approaches have involved exposure to high energy radiation, for example, electron beam (E-beam) or high intensity ultraviolet (UV) radiation. E-beam techniques, however, have required high capital investment and have been complex to control. Accordingly, much interest has been focused on UV radiation techniques.

UV radiation crosslinking of coated polymers has relied almost exclusively on hydrogen abstraction methods, in which a hydrogen abstracting agent (for example, benzophenone or anthraquinone) is mixed into the polymer composition prior to or during the coating process, and the resulting composition is then crosslinked by exposure to UV radiation. The separate mixing step can be eliminated by incorporating the hydrogen abstracting functionality directly into the polymer, for example, by copolymerization (with other monomers) of an unsaturated monomer containing a hydrogen abstracting moiety. Although this latter technique provides a more efficient crosslinking mechanism, a substantial amount of high energy UV exposure is necessary to achieve a satisfactory degree of crosslinking, as the energy necessary to activate the hydrogen abstracting moieties is relatively high.

This limitation is especially pronounced for thick polymer coatings because of the difficulty in achieving deep penetration of high levels of UV radiation. A crosslinking gradient therefore often results, especially when the polymer (or any additives present) absorb near the absorption maximum of the hydrogen abstracting moieties. Furthermore, neither foaming nor the use of opaque fillers or pigments is possible (due to interference with UV penetration), and, since any compound with an abstractable hydrogen atom can be involved in the crosslinking reaction, many common tackifiers, plasticizers, antioxidants, and other common additives cannot be utilized.

Thus, there remains a need in the art for a process for crosslinking melt-processed polymer compositions that does not require expensive equipment, that can be easily and effectively adjusted and controlled to obtain the desired level of crosslinking, that can be used to crosslink even foamed or filled compositions and thick polymer coatings without producing a crosslinking gradient, and that is effective even in the presence of common additives.

SUMMARY OF THE INVENTION

Briefly, in one aspect, this invention provides a process for crosslinking a melt-processed polymer composition comprising the steps of (a) forming a polymerizable mixture comprising (i) at least one monoethylenically-unsaturated monomer or prepolymer and (ii) at least one monoethylenically-unsaturated, blocked mono- or polyisocyanate that is thermally stable at a selected melt processing temperature range and that is thermally deblockable at and above a deblocking temperature that is higher than the selected melt processing temperature range; (b) exposing the polymerizable mixture to transmissive energy to polymerize the mixture to form a polymer composition comprising polymerized units derived from the blocked mono- or polyisocyanate; (c) melt processing the polymer composition at the selected melt processing temperature range to form a melt-processed polymer composition; and (d) during melt processing or thereafter, increasing the temperature of the melt-processed polymer composition to the deblocking temperature, in the presence of at least one isocyanate-reactive crosslinking agent, to effect crosslinking of the melt-processed polymer composition. Preferably, the monomer is an acrylate or methacrylate monomer, and the blocked mono- or polyisocyanate, upon deblocking, releases a compound having a boiling point below the deblocking temperature.

It has been discovered that, in spite of the large amounts of thermal energy involved in the melt processing of polymer compositions, thermal techniques for crosslinking such compositions need not be totally overlooked. Surprisingly, the thermal deblocking of blocked isocyanates can be controlled so as to prevent premature crosslinking during melt processing, yet enable reliably fast and even crosslinking to occur upon demand thereafter. Control can be achieved by using blocked isocyanates that are copolymerizable, that are thermally stable at the selected melt processing temperatures, that are thermally deblockable at and above a deblocking temperature that is higher than the selected melt processing temperatures, and that preferably deblock to release a compound (the blocking agent or a residue thereof) that is volatile at the deblocking temperature. Such blocked isocyanates can withstand typical melt processing temperatures without volatilization and loss (since they, upon copolymerization with the other monomer(s), become an integral part of the polymer itself), and they do not significantly deblock at the melt processing temperatures (since their deblocking temperatures are higher). However, when the temperature of the polymer composition is raised to the deblocking temperature, crosslinking occurs quickly (apparently due to a rapid and substantially complete deblocking of the isocyanate, which appears to be facilitated by the release of volatile blocking agent).

Thus, the deblocking step of the process of the invention can be carried out, for example, in a later stage of the melt processing step (for example, by raising the temperature of the last zone (adjacent to the coating head) of a melt extruder) or after melt processing (for example, by using inexpensive, readily available equipment such as infrared heaters or ovens for raising the temperature of the melt-processed composition). Only short heat (infrared) exposure times are needed to effect the crosslinking of even thick polymer coatings, with essentially no limitations as to foaming, pigmentation, tackifier use, etc.

Thus, the process of the invention meets the need in the art for a process for crosslinking melt-processed polymer compositions that does not require expensive equipment, that can be easily and effectively adjusted and controlled to obtain the desired level of crosslinking, that can be used to crosslink even foamed or filled compositions and thick polymer coatings without producing a crosslinking gradient, and that is effective even in the presence of common additives.

In another aspect, this invention also provides a pre-PSA composition comprising (a) at least one acrylic or methacrylic ester of a non-tertiary alkyl alcohol, the alkyl group having from 1 to about 20 carbon atoms; (b) at least one monoethylenically-unsaturated, blocked mono- or polyisocyanate that is thermally stable at a selected melt processing temperature range and that is thermally deblockable at and above a deblocking temperature that is higher than the selected melt processing temperature range; and (c) at least one isocyanate-reactive crosslinking agent. Preferably, the blocked mono- or polyisocyanate, upon deblocking, releases a compound having a boiling point below the deblocking temperature. Upon polymerization of the pre-PSA composition, the resulting polymer composition is melt-processable, yet thermally-crosslinkable.

In other aspects, this invention further provides a composition prepared by the process of the invention, an article comprising the composition, a PSA composition prepared from the pre-PSA composition of the invention, and an article comprising the PSA composition.

BRIEF DESCRIPTION OF THE DRAWINGS

These and other features, aspects, and advantages of the present invention will become better understood with regard to the following description, appended claims, and accompanying drawings, wherein:

DETAILED DESCRIPTION OF THE INVENTION

Monoethylenically-Unsaturated Monomers

Monomers suitable for use in the process of the invention are monoethylenically unsaturated and can be selected so as to provide a tacky, non-tacky, or tackifiable composition, according to the requirements of a particular application. Representative examples of such monomers include styrene, α-methylstyrene, vinyl esters, vinyl chloride, vinylidene chloride, acrylonitrile, fluorine-containing vinyl monomers, vinyl ethers, and the like (and mixtures thereof), as well as the acrylic or methacrylic esters of non-tertiary alkyl alcohols such as methanol, ethanol, 1-propanol, 2-propanol, 1-butanol, 2-methyl-1-propanol, 1-pentanol, 2-pentanol, 3-pentanol, 2-methyl-1-butanol, 1-methyl-1-butanol, 3-methyl-1-butanol, 1-methyl-1-pentanol, 2-methyl-1-pentanol, 3-methyl-1-pentanol, cyclohexanol, furfuryl alcohol, 2-ethyl-1-butanol, 3-heptanol, benzyl alcohol, 2-octanol, 6-methyl-1-heptanol, 2-ethyl-1-hexanol, 3,5-dimethyl-1-hexanol, 3,5,5-trimethyl-1-hexanol, 1-decanol, 1-dodecanol, 1-hexadecanol, 1-octadecanol, and the like, and mixtures thereof Such monomers are known in the art, and many are commercially available. Prepolymers formed from one or more of the monomers (for example, a syrup formed by partial polymerization of the monomer(s)) can also be utilized.

Preferred monoethylenically-unsaturated monomers can be polymerized to form a PSA composition and include the acrylic and methacrylic esters of non-tertiary alkyl alcohols, the alkyl groups having from 1 to about 20 carbon atoms (preferably, from about 3 to about 18 carbon atoms). Such preferred monomers include methyl acrylate, ethyl acrylate, n-butyl acrylate, lauryl acrylate, 2-ethylhexyl acrylate, phenoxy ethyl acrylate, cyclohexyl acrylate, iso-octyl acrylate, octadecyl acrylate, nonyl acrylate, decyl acrylate, dodecyl acrylate, and aromatic acrylates such as benzyl acrylate and cyclobenzyl acrylate, and the like, and mixtures thereof If desired, such preferred monomers can be copolymerized with up to about 50 parts by weight (per 100 parts by weight of the monoethylenically-unsaturated monomer(s)) of one or more monoethylenically-unsaturated co-monomers selected from those having a homopolymer glass transition temperature greater than the glass transition temperature of a homopolymer of the preferred monomer(s). Representative examples of suitable co-monomers include acrylic acid, acrylamide, methacrylamide, substituted acrylamides such as N,N-dimethyl acrylamide, itaconic acid, methacrylic acid, acetoacetoxy alkyl acrylates, acrylonitrile, methacrylonitrile, vinyl acetate, N-vinyl pyrrolidone, isobornyl acrylate, cyano ethyl acrylate, N-vinylcaprolactam, maleic anhydride, hydroxyalkylacrylates, N,N-dimethyl aminoethyl(meth)acrylate, N,N-diethylacrylamide, beta-carboxyethyl acrylate, vinyl esters of neodecanoic, neononanoic, neopentanoic, 2-ethylhexanoic, or propionic acids (for example, those available from Union Carbide Corporation of Danbury, Connecticut under the designation "Vynates"), vinylidene chloride, styrene, vinyl toluene, alkyl vinyl ethers, and the like, and mixtures thereof.

A second class of co-monomers that can be copolymerized with the preferred monoethylenically-unsaturated monomers (to form a PSA composition) includes those monoethylenically-unsaturated monomers having a homopolymer glass transition temperature lower than the glass transition temperature of the homopolymer of the preferred monomer(s). Such co-monomers include ethoxyethoxy ethyl acrylate and methoxypolyethylene glycol 400 acrylate (the latter being available from Shin Nakamura Chemical Co., Ltd., under the designation "NK Ester AM-90G").

Blocked Isocyanates

Blocked isocyanates suitable for use in the process of the invention are those monoethylenically-unsaturated, blocked mono- or polyisocyanates that are thermally stable at a selected melt processing temperature range and that are thermally deblockable at and above a deblocking temperature that is higher than the selected melt processing temperature range. Preferably, the blocked mono- or polyisocyanates, upon deblocking, release a compound that is either volatile at the deblocking temperature or that decomposes to form one or more compounds that are volatile at the deblocking temperature. The blocked isocyanates can be prepared through the reaction of monoethylenically-unsaturated, organic mono- or polyisocyanates with blocking agents. As used herein, the term "blocked" means temporarily unreactive due to a thermally-reversible masking of the isocyanate functionality through reaction with a suitable blocking agent (active hydrogen-containing compound).

Suitable organic mono- or polyisocyanates for use in preparing the blocked isocyanates include monoethylenically-unsaturated, aromatic mono- and polyisocyanates (for example, 4-isocyanatostyrene, 4-(2-acryloyloxyethoxycarbonylamino)phenylisocyanate, isopropenyl-α,α-dimethylbenzyl isocyanate, and the like); monoethylenically-unsaturated, aliphatic mono- and polyisocyanates (for example, 2-isocyanatoethyl methacrylate, 2-isocyanatoethyl acrylate, 3-isocyanatopropyl methacrylate, 3-isocyanatopropyl acrylate, 2-methyl-2-propenoyl isocyanate, allyl 2-isocyanatoethylether, 3-isocyanato-1-propene, and the like); and monoethylenically-unsaturated, alicyclic mono- and polyisocyanates (for example, 4-isocyanatocyclohexyl methacrylate, 4-isocyanatocyclohexyl acrylate, and the like); and mixtures thereof Preferred organic mono- or polyisocyanates for use in preparing the blocked isocyanates include monoethylenically-unsaturated, aromatic mono- and polyisocyanates.

Preferably, the organic isocyanate is a mono- or polyisocyanate (preferably, a monoisocyanate) that comprises an acryloyl, methacryloyl, styryl, or α-methylstyryl moiety (more preferably, a styryl or α-methylstyryl moiety; even more preferably, an α-methylstyryl moiety). Most preferably, the organic isocyanate is isopropenyl-α,α-dimethylbenzyl isocyanate.

Suitable blocking agents for reaction with the organic mono- or polyisocyanates are those isocyanate-reactive compounds (for example, phenols, lactams, oximes, imides, alcohols, pyrazoles, and the like) that, upon reaction with the isocyanate, provide a blocked isocyanate that is thermally stable at a selected melt processing temperature range, that is thermally deblockable at and above a deblocking temperature that is higher than the selected melt processing temperature range, and that preferably deblock to release a compound (the blocking agent or a residue thereof) having a boiling point below the deblocking temperature (preferably, at least about 50 degrees Centigrade (° C.) below the deblocking temperature in degrees Centigrade; more preferably, at least about 90 degrees below). Since melt processing techniques generally involve temperatures in the range of about 100° C. to about 200° C. (preferably, about 120° C. to about 180° C.;

more preferably, about 135° C. to about 145° C.), suitable blocking agents are generally those that provide blocked isocyanates that are substantially stable at these temperatures and for which the onset of deblocking does not occur at these temperatures. Preferably, the onset of deblocking occurs at a temperature at least about 10° C. above the maximum temperature (in ° C.) of the selected melt processing temperature range (more preferably, about 15° C.; most preferably, about 20° C.).

Thus, preferred blocking agents include phenols, oximes, and alcohols (preferably, alcohols; more preferably, alkanols; even more preferably, alkanols having from 1 to about 6 carbon atoms; even more preferably, methanol, ethanol, isopropanol, n-butanol, sec-butanol, t-butanol, n-pentanol, or n-hexanol; most preferably, isopropanol, n-butanol, sec-butanol, or t-butanol).

The reaction of the organic mono- or polyisocyanate and the blocking agent can be carried out by any of the methods known in the art. The reaction can be carried out in bulk or in inert solvent at temperatures of, for example, about 50–120° C. For completely-blocked isocyanates, equivalent ratios of isocyanate-reactive groups to isocyanate groups of 1/1–2/1 or higher can be utilized. Completely blocked isocyanates are strongly preferred, but these ratios can be adjusted downward if only partially-blocked isocyanates are desired for a particular application.

Polymerization

Copolymerization of the monoethylenically-unsaturated monomer or prepolymer and the monoethylenically-unsaturated, blocked mono- or polyisocyanate can be accomplished by any conventional (preferably, free radical) polymerization method, for example, by known solution, emulsion, suspension, and bulk polymerization techniques. However, suspension polymerization (for example, as described in U.S. Pat. Nos. 4,833,179 and 4,952,650 (Young et al.), the descriptions of which are incorporated herein by reference) and bulk polymerization are preferred. Bulk polymerization is more preferred, as bulk-polymerized compositions can be immediately melt processed without the need for an intermediate solvent or water removal step. Polymerization can be effected according to the conventional methods by exposing the polymerizable mixture to transmissive energy (for example, UV radiation, visible radiation, thermal radiation, or thermal conduction), optionally, while in contact with a heat exchange medium (for example, water).

If desired, the polymerizable mixture comprising monomer(s) (and/or prepolymer(s)) and copolymerizable blocked isocyanate(s) can be enclosed in a packaging material prior to effecting bulk polymerization by exposure to transmissive energy (for example, as described in U.S. Pat. No. 5,804,610 (Hamer et al.), the description of which is incorporated herein by reference). The packaging material can be selected so as to be melt-processable and so that it does not adversely affect the desired properties of the resulting melt-processed composition. The packaging material can be a flexible thermoplastic polymeric film of, for example, ethylene-vinyl acetate copolymer, ethylene-acrylic acid copolymer, polypropylene, polyethylene, polybutadiene, or ionomeric polymer. If the use of packaging material is not desired, other bulk polymerization techniques can be effectively employed (for example, the techniques described in U.S. Pat. Nos. 4,181,752 (Martens et al.) and 5,932,298 (Moon), the descriptions of which are incorporated herein by reference).

The copolymerizable blocked isocyanate(s) can be added to the monomer(s) and/or prepolymer(s) in an amount sufficient to provide the desired level of crosslinking upon deblocking. Preferably, the blocked isocyanate(s) constitute from about 0.001 to about 15 parts by weight (per 100 parts by weight of all polymerizable components), more preferably, from about 0.01 to about 10 parts by weight, most preferably, from about 0.05 to about 5 parts by weight.

In addition to the isocyanate(s) and monomer(s) and/or prepolymer(s), the polymerizable mixture can further contain one or more initiators. For polymerization by exposure to UV radiation, a photoinitiator can be included. Useful photoinitiators include substituted acetophenones such as benzyl dimethyl ketal and 1-hydroxycyclohexyl phenyl ketone; substituted alpha-ketols such as 2-methyl-2-hydroxypropiophenone; benzoin ethers such as benzoin methyl ether and benzoin isopropyl ether; substituted benzoin ethers such as anisoin methyl ether; aromatic sulfonyl chlorides; photoactive oximes; and the like (and mixtures thereof). Photoinitiator can be added in an amount sufficient to provide the desired polymerization rate, conversion, and molecular weight (of resulting polymer). Generally, such an amount can range from about 0.001 to about 5.0 parts by weight (per 100 parts by weight of all polymerizable components), preferably, from about 0.01 to about 5.0 parts by weight, more preferably, from about 0.1 to about 0.5 parts by weight.

For thermal polymerization, a thermal initiator can be included in the polymerizable mixture. Useful thermal initiators include azo, peroxide, persulfate, and redox initiators. Representative examples of suitable thermal initiators include azo initiators such as 2,2'-azobis(2,4-dimethylvaleronitrile), 2,2'-azobis(isobutyronitrile), 2,2'-azobis-2-methylbutyronitrile, 1,1'-azobis(1-cyclohexanecarbonitrile), 2,2'-azobis(methyl isobutyrate), 2,2'-azobis(2-amidinopropane) dihydrochloride, and 2,2'-azobis(4-methoxy-2,4-dimethylvaleronitrile); peroxide initiators such as benzoyl peroxide, acetyl peroxide, lauroyl peroxide, decanoyl peroxide, dicetyl peroxydicarbonate, di(4-t-butylcyclohexyl) peroxydicarbonate, di(2-ethylhexyl) peroxydicarbonate, t-butylperoxypivalate, t-butylperoxy-2-ethylhexanoate, and dicumyl peroxide; persulfate initiators such as potassium persulfate, sodium persulfate, and ammonium persulfate; redox (oxidation-reduction) initiators such as combinations of the above persulfate initiators with reducing agents such as sodium metabisulfite and sodium bisulfite, systems based on organic peroxides and tertiary amines, and systems based on organic hydroperoxides and transition metals; other initiators such as pinacols; and the like (and mixtures thereof). Azo compounds and peroxides are generally preferred. Thermal initiator can be added in an amount sufficient to provide the desired polymerization rate, conversion, and molecular weight (of resulting polymer). Generally, such an amount can range from about 0.01 to about 5.0 parts by weight (per 100 parts by weight of all polymerizable components), preferably, from about 0.025 to about 2.0 parts by weight.

If desired, a combination of thermal and photoinitiation can be utilized. For example, the polymerizable mixture can be polymerized (for example, in a reactive extruder) to a certain conversion using a thermal initiator and then combined with a photoinitator and exposed to UV radiation to complete the polymerization. Conversely, the initial polymerization can be initiated using a photoinitiator and the polymerization subsequently completed using a thermal initiator. The thermal initiator and the photoinitiator can also be used together, rather than being added sequentially.

Optionally, the polymerizable mixture can also contain a chain transfer agent to control the molecular weight of the resulting polymer. Useful chain transfer agents include halogenated hydrocarbons such as carbon tetrabromide; sulfur compounds such as lauryl mercaptan, butyl mercaptan, ethanethiol, isooctylthioglycolate, 2-ethylhexyl thioglycolate, 2-ethylhexyl mercaptopropionate, 2-mercaptoimidazole, and 2-mercaptoethyl ether; solvents such as ethanol, isopropanol, and ethyl acetate; and the like (and mixtures thereof). Chain transfer agent can be added to the polymerizable mixture in an amount sufficient to obtain the desired molecular weight. Generally, such an amount can range from about 0.001 to about 10 parts by weight (per 100 parts by weight of all polymerizable components), preferably, from about 0.01 to about 0.5 parts by weight, more preferably, from about 0.02 to about 0.2 parts by weight.

If desired, other additives can be included in the polymerizable composition or can be added at a later stage, for example, at the time of melt processing. Useful additives include, for example, dyes, pigments, antioxidants, ultraviolet stabilizers, foaming agents, flame retardants, surfactants, glass or polymeric bubbles or beads, fibers, reinforcing agents, hydrophobic or hydrophilic silica, calcium carbonate, toughening agents, plasticizers, tackifiers, fillers, viscosity modifiers, thermally conductive particles (such as flakes, rods, beads, powders, and fibers), electrically conductive particles, antistatic agents, expanded or unexpanded bubbles, microwave susceptors, and the like, and mixtures thereof. Such additives can be added in amounts sufficient to obtain the desired end properties.

Crosslinking Agents

Crosslinking agents suitable for use in the process and composition of the invention are those that comprise at least one isocyanate-reactive group. The agent(s) can be monoethylenically-unsaturated monomer(s) that can be (and preferably are) added to the polymerizable mixture and copolymerized with the monoethylenically-unsaturated monomer(s) (and/or prepolymer(s)) and the monoethylenically-unsaturated, blocked mono- or polyisocyanate(s). Alternatively, the agent(s) can be compounds that are not capable of copolymerization with the monomer(s) (and/or prepolymer(s)) and blocked isocyanate (s), but that comprise at least two isocyanate-reactive groups and are of sufficient molecular weight so as to be substantially non-volatile at the selected melt-processing temperature range and at the isocyanate deblocking temperature (having a boiling point above the maximum temperature of the melt-processing temperature range and above the deblocking temperature). The latter type of crosslinking agents (non-copolymerizable) can be added at any time prior to or during melt processing (for example, prior to polymerization of the polymerizable mixture, or after polymerization but prior to or during melt processing). However, copolymerizable crosslinking agents are generally preferred.

Suitable isocyanate-reactive groups include groups containing active hydrogen atoms (for example, —COOH, —OH, —NH$_2$, =NH, —CONH$_2$, and —SH), as determined by a Zerewitinoff test. Thus, representative examples of suitable copolymerizable crosslinking agents include carboxyl group-containing monomers such as methacrylic acid, acrylic acid, crotonic acid, maleic acid, fumaric acid, and itaconic acid; hydroxyl-group containing monomers such as methallyl alcohol, allyl alcohol, hydroxyethyl methacrylate, hydroxyethyl acrylate, hydroxypropyl methacrylate, hydroxypropyl acrylate, di- or triethylene glycol methacrylate, di- or triethylene glycol acrylate, and poly (oxyethyleneoxypropylene)glycol monomethallyl ether; amide group-containing monomers such as N-methylol methacrylamide, N-methylol acrylami de, N-hydroxyethyl methacryl amide, N-hydroxyethyl acrylamide, N,N-dihydroxyethyl methacrylamide, N,N-dihydroxyethyl acrylamide, methacrylamide, and acrylamide; amino group-containing monomers such as t-butylaminoethyl methacrylate and t-butylaminoethyl acrylate; mercapto group-containing monomers such as vinyl 2-ethylmercaptoethyl ether; and the like (and mixtures thereof). Such monomers are known, and many are commercially available. Preferred copolymerizable crosslinking agents are those that contain at least one carboxyl, hydroxyl, or amino group (more preferably, at least one carboxyl or hydroxyl group; most preferably, at least one carboxyl group).

Representative examples of suitable non-copolymerizable crosslinking agents include the low molecular weight (for example, below about 1000, preferably below about 600) secondary amine reaction products of maleic acid esters and polyamines, that is, low molecular weight aspartic ester polyamines such as N,N'-(4,4'-dicyclohexylmethane-diyl) bis tetraethyl aspartic ester, N,N'-(hexane-1,6-diyl) bis tetraethyl aspartic ester, N,N'-(2-methylpentane-1,5-diyl) tetrabutyl aspartic ester, N,N'-(3,3-dimethyldcyclohexylmethane-4,4'-diyl)-bis-tetraethyl aspartic ester, N,N'-(bis-2-propyl)polypropyleneglycol 300-O,O'-diyl-bis-tetraethyl aspartic ester, N,N'-(butyl-1,4-diyl)-bis-tetraethyl aspartic ester, N,N'-(2,2-dimethylpropane-1,3-diyl)-bis-tetraethyl aspartic ester, N,N'-(2,4-dimethylhexane-1,6-diyl)-bis-tetraethyl aspartic ester, and the like; polyols such as ethylene glycol, 1,2- and 1,3-propanediol, 1,3- and 1,4- and 2,3-butanediol, diethylene glycol, dipropylene glycol, tripropylene glycol, 1,6-hexanediol, 1,4-cyclohexane dimethanol, 3-methyl 1,5-pentanediol, neopentyl glycol, 3-hydroxy-2,2-dimethylpropyl 3-hydroxy-2,2-dimethylpropanate, 2,2,4-trimethyl-1,3-pentanediol, trimethylolpropane, di-trimethylolpropane, pentaerythritol, di-pentaerythritol, and the like; secondary polyamines such as 1,3-di(4-piperidyl)propane (DIPIP), N(2-aminoethyl propylmethyldimethoxysilane (DAS), piperazine, N,N'-dialkyl(methylene)dianiline, N,N'-dialkyl(1,4-diamino)benzene, N,N'-bis(diisopropylmethyl)diaminoethane, N,N'-bis(t-butyl)diamino cyclohexane), and the like; polycarboxylic acids such as aliphatic alkyldicarboxylic acids (for example, 1,4-cyclohexanedicarboxylic acid, propanedicarboxylic acid, butanedicarboxylic acid, pentanedicarboxylic acid, and hexanedicarboxylic acid), aromatic dicarboxylic acids (for example, 1,2-benzenedicarboxylic acid, 1,3-benzenedicarboxylic acid, and 1,4-benzenedicarboxylic acid), and the like; and mixtures thereof. Such compounds are known, and many are commercially available. Suitable aspartic ester polyamines are commercially available from Bayer (Pittsburgh, Pennsylvania, USA or Leverkusen, Germany) under the trade designations Desmophen™ XP-7053, XP-7059, VP-LS 2973, and XP-7109, for example. Preferred non-copolymerizable crosslinking agents are polyols and polycarboxylic acids.

The crosslinking agent(s) can be added in amounts sufficient to achieve the level of crosslinking and the isocyanate reaction rate desired for a particular application. Preferably, such amounts will be greater than or equal to the stoichiometric amount required for the reaction of all free (that is, deblocked) isocyanate groups.

Melt Processing, Deblocking, and Crosslinking

Melt processing of the polymer composition can be carried out by any of the methods and equipment known in the art, for example, by molding, melt blowing, melt spinning, melt extrusion, or reactive extrusion (which can be utilized to accomplish both the polymerization and melt processing steps). When the polymer composition is a PSA composition, it can be hot melt coated onto a substrate, if desired, using, for example, a heated extruder, a bulk tank melter, melt-on-demand equipment, or a hand-held hot melt adhesive gun.

Melt processing of the polymer composition can be carried out at temperatures below the deblocking temperature(s) of the blocked isocyanate(s) utilized. Generally, temperatures in the range of about 100° C. to about 200° C. (preferably, about 120° C. to about 180° C.; more preferably, about 135° C. to about 145° C.) can be utilized.

The temperature of the melt-processed composition can be raised to the deblocking temperature of the isocyanate during melt processing (for example, in a later or advanced stage thereof, preferably, in a final stage thereof), if desired. For example, in melt extrusion, the last zone of the extruder (adjacent to the coating head), the coating head itself, or both can be raised to the deblocking temperature to effect crosslinking of the melt-processed composition as it leaves the extruder. Alternatively, the melt-processed composition can be extruded, optionally onto a substrate, and then crosslinked at a later time (for example, using a circulating air oven, an infrared or near infrared heater, or a high frequency heater). The composition can be held at or above the deblocking temperature for a time sufficient to achieve the level of crosslinking desired for a particular application. Generally, heating times of up to about 15 to 60 minutes can be effective (preferably, up to about 10 minutes; more preferably, up to about 5 minutes). If desired, a catalyst (for example, a tertiary amine or an organometallic compound) can be utilized to facilitate the deblocking of the isocyanate and/or the reaction of the free isocyanate with the crosslinking agent, as is known in the art.

The process of the invention provides crosslinked, melt-processed polymer compositions that can meet the performance requirements of a variety of applications, including pressure sensitive adhesive applications. For example, the compositions can be coated on, or laminated to, substrates such as backings, release liners, or reclosable fasteners to provide single-coated or double-coated sheets or tapes, adhesive transfer tapes, and adhesive-backed articles. The compositions are also useful as damping materials for use alone, for use in combination with constraining layers, or for use between two substrates to provide damped laminates.

Objects and advantages of this invention are further illustrated by the following examples, but the particular materials and amounts thereof recited in these examples, as well as other conditions and details, should not be construed to unduly limit this invention. Unless otherwise indicated, all amounts in the examples are expressed according to the following system. All polymerizable components add up to a sum of 100 parts, including monomers and copolymerizable blocked isocyanates. Non-copolymerizable materials (for example, polymerization initiators) are expressed as parts by weight in addition to 100 parts by weight of polymerizable components.

EXAMPLES

Test Methods Related to Deblocking and Crosslinking

I. Method of Determining Onset of Crosslinking (° C.) and Rate of Crosslinking

Polymer compositions capable of deblocking and crosslinking were subjected to increasing temperatures. Viscosity of the polymer composition was then recorded as a function of time. The temperature vs. viscosity measurements were made using a dynamic mechanical analyzer available as Dynamic Analyzer Model RDA II from Rheometrics, Inc., Piscataway, N.J., USA. A circular sheet of polymer composition having a thickness of 1 mm and a diameter of 20 cm was placed between the sample plates of the analyzer. Measurements of complex viscosity were made in the oscillation mode at a frequency of 1 Hz. The analyzer was programmed to provide a temperature increasing from 20° C. to 220° C. at a rate of 20° C. per minute. A resulting plot of viscosity in Pascal seconds (Pa·s)(y-axis) versus temperature in degrees Centigrade (x-axis) was then analyzed in the following manner to determine the onset of crosslinking and the rate of crosslinking.

a) Onset of Crosslinking(° C.)

Figure 2:
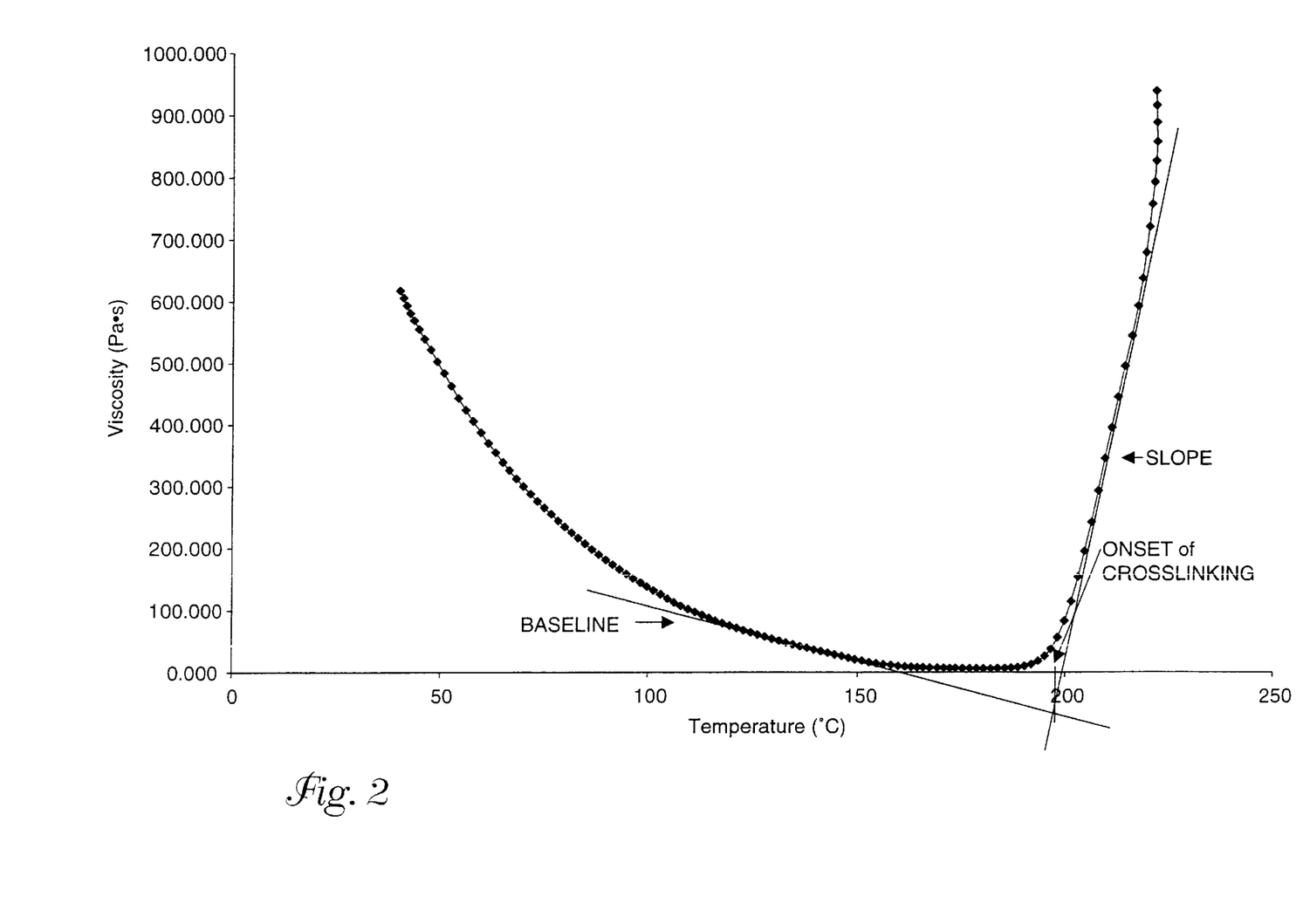
FIG. 2 is a plot of viscosity versus temperature for one of the polymer compositions and is labeled to show the techniques used to determine the temperature of the onset of crosslinking, as well as the rate of crosslinking, as described in the section of the Examples, infra, entitled "Test Methods Related to Deblocking and Crosslinking."

As shown in FIG. 2, a first tangent line (labeled "baseline") was drawn against the portion of the resulting curve where a decrease in viscosity of the polymer composition as a function of temperature was observed. A second tangent line (labeled "slope") was then drawn against the portion of the curve where the viscosity of the polymer composition increased rapidly as a function of temperature. The point of intersection of the first tangent line and the second tangent line was marked, and the distance of this point along the x-axis (° C.) was taken as the temperature of the onset of crosslinking of the polymer composition.

b) Rate of Crosslinking

The slope of the second tangent line described above in a) was measured. The slope of this line can be related to the rate of the crosslinking of the polymer composition that occurs once the onset of crosslinking has been reached.

II. Gel Content

A sample of between 0.5 and 1.5 grams of polymeric material was placed in the center of a stainless steel wire mesh. The mesh was folded together once and placed in a closed vessel with 150 g tetrahydrofuran (THF). The vessel was agitated at 23° C. for 12 hours. After removing the mesh/sample from the THF, it was dried in a forced air oven at 70° C. for 2 hours. The mesh bearing the sample was reweighed, and the weight of remaining insoluble gel was determined by difference. The remaining weight divided by the original weight of the sample was then expressed in percent.

Test Methods Related to Pressure-Sensitive Adhesive Properties

I. 23° C. Static Shears, 500 g or 1 kg

Static shear was measured according to PSTC-7 (Procedure A) available from the Pressure Sensitive Tape Council, Glenview, Ill./USA. The adhesive to be tested was obtained as a uniform layer supported on a siliconized paper or film liner. The exposed adhesive face was adhered to a 12.7 mm wide, 140 micron thick anodized aluminum foil, thereby forming an adhesive tape with an aluminum foil backing. This single-sided adhesive tape was then tested as follows. An exposed adhesive area of 25.4 mm x 12.7 mm was adhered to a stainless steel test plate of the appropriate dimensions to be held at 2° from vertical in a shear testing rack. The adhered area was rolled down with a 2 kg rubber-coated roller, which was passed over the bonded area 4 times. The adhesive tape was allowed to dwell on the steel plate for a period of 20 minutes before a weight was hung on the tape sample. A weight of either 500 g or 1 kg was applied, as specified in each data table below. The time of failure of the adhesive bond was recorded in minutes. The mode of failure (adhesive or cohesive) was also noted.

II. Shear Adhesion Failure Temperature (SAFT)

Test specimens were prepared in a manner essentially identical to that described above for the 23° C. Static Shear test. The shear stand bearing the adhered test sample and weight were then placed in a forced air oven having a programmable temperature control. The samples were first held at 30° C. for 20 minutes. Then the temperature was increased at a rate of 1° C. per minute until bond failure occurred. The time of the failure was recorded, and then, based on the failure time and the temperature program, the failure temperature was calculated. This temperature is the Shear Adhesion Failure Temperature (SAFT) in ° C.

III. 180° Peel Adhesion

180° Peel Adhesion was measured according to PSTC-3 available from the Pressure Sensitive Adhesive Tape Council, Glenview, Ill./USA. A single-sided adhesive tape bearing an anodized aluminum foil backing was prepared from an adhesive film essentially as described above for the 23° C. Static Shear test. This single-sided tape was then subjected to a 180° Peel Adhesion test in the following manner. A strip of aluminum-backed tape having a width of 10 mm was applied by hand to a stainless steel test plate. A 2 kg roller was rolled over the adhesive bond four times. The tape was allowed to dwell on the stainless steel plate for 20 minutes before 180° peel adhesion was measured according to PSTC-3. The results were recorded in N/cm.

Preparation of Copolymerizable Blocked

Isocyanates I–VII

Dimethyl m-isopropenyl benzyl isocyanate (m-TMI) was blocked with seven different blocking agents, respectively, to provide copolymerizable blocked isocyanates for use in the Examples and Comparative Examples.

Preparation of Isocyanate I:

Dimethyl m-Isopropenyl Benzyl Isocyanate (m-TMI) Blocked with t-Butanol

An eight-fold molar excess of t-butanol (600.0 g or 8 moles) was combined with (201.3 g or 1 mole) dimethyl m-isopropenyl benzyl isocyanate (m-TMI available from Cytec Industries, Inc., West Patterson, N.J.) in a 3-necked, 1 liter flask. The flask was fitted with a mechanical stirrer, a reflux condenser, and a thermometer. A dry nitrogen flush was provided, and the flask was flame dried under nitrogen flow. The mixture in the flask was then heated to a reflux temperature of ca. 90° C. for 12 hours. Residual t-butanol was stripped off under vacuum to leave the blocked isocyanate product. Removal of final traces of t-butanol was effected by application of high vacuum. Residual NCO content was measured by a standard butyl amine titration method (according to Deutsche Industrie Norm DIN 53 185). The resulting solid (dimethyl m-isopropenyl benzyl) t-butyl carbamate (Isocyanate I) showed a melting point of 60° C. (lit. 60° C.).

Preparation of Isocyanate II:

Dimethyl m-Isopropenvl Benzyl Isocyanate (m-TMI) Blocked with Isopropanol

An eight-fold excess of isopropanol (480 grams or 8 moles) was employed as the blocking agent and solvent for the reaction. A mixture of the isopropanol and 201.3 g or 1 mole of dimethyl m-isopropenyl benzyl isocyanate (m-TMI available from Cytec Industries, Inc., West Patterson, N.J.) was refluxed for 5 hours and purified by stripping off the remaining isopropanol first under moderate vacuum and finally under high vacuum. The resulting blocked isocyanate, (dimethyl m-isopropenyl benzyl) isopropyl carbamate (Isocyanate II), was liquid at ambient temperatures (melting point ca. 20° C.).

Preparation of Isocyanate III:

Dimethyl m-Isopropenvl Benzyl Isocyanate (m-TMI) Blocked with n-Butanol 107.74 g (0.54 moles) m-TMI was combined with 238.9 g (3.33 moles) n-butanol, corresponding to a six-fold excess of blocking agent, in essentially the manner described under the preparation of Isocyanate I. The resulting mixture was refluxed for 4 hours. Rotary evaporation was employed to remove excess blocking agent, followed by high vacuum to remove most traces of volatile matter. The resulting solid (Isocyanate III) had a melting point of 27° C.

Preparation of Isocvanate IV:

Dimethyl m-Isopropenvl Benzyl Isocyanate (m-TMI) Blocked with n-Hydroxy Succinimide 86.8 g (0.43 moles) of m-TMI was combined with 50.52 g (0.44 moles) of n-hydroxy succinimide in a solvent mixture of 134 g toluene and 32 g methylene chloride. The resulting mixture was held at 45° C. for 12 hours. The resulting crude product, which had precipitated during the reaction, was collected and then washed with cold methylene chloride. The resulting product (Isocyanate IV) had a melting point of 135–137° C.

Preparation of Isocyanate V:

Dimethyl m-Isopropenyl Benzyl Isocyanate (m-TMI) Blocked with ε-Caprolactam 100.63 g (0.5 moles) m-TMI was combined with 57.63 g (0.51 moles) of ε-caprolactam in heptane as a solvent, corresponding to an amount only slightly in excess (1%) of the stoichiometric amount. The reaction mixture was heated for 5 hours at 80° C. The resulting crude product, which had precipitated during the reaction, was collected and then washed with cold heptane. The resulting product (Isocyanate V) had a melting point of 70° C.

Preparation of Isocyanate VI:

Dimethyl m-Isopropenyl Benzyl Isocyanate (m-TMI) Blocked with Methylethylketoxime 100.53 g (0.5 moles) m-TMI was combined with 44.31 g (0.51 moles) of methylethylketoxime, corresponding to a 1% excess of the blocking agent. The resulting mixture was held at 45° C. for two hours. The resulting product liquid (Isocyanate VI) was obtained in 95% yield.

Preparation of Isocyanate VII:

Dimethyl m-Isopropenyl Benzyl Isocyanate (m-TMI) Blocked with 3,5-Dimethylpyrazole 104 g (0.52 mole) of m-TMI was combined with 50.2 g (0.52 mole) of 3,5-dimethylpyrazole (corresponding to about a 1% excess of blocking agent) and 162 g heptane. The resulting mixture was heated for two hours. A maximum temperature of 88° C. was reached. The heptane was then removed by rotary evaporation. The resulting product liquid (Isocyanate VII) was obtained in a yield of 95%.

Example 1

Preparation of Polymer Composition

Copolymerizable blocked Isocyanate I, prepared by the method described above, was copolymerized with acrylic monomers in a bulk polymerization process. 1.47 parts by weight (per 100 parts by weight of all polymerizable components) of Isocyanate I was combined with 93.60 parts by weight isooctyl acrylate (IOA) and 4.93 parts by weight acrylic acid (AA) to give a total of 100 parts by weight of all polymerizable components. IRGACURE™ 651 UV photoinitiator (2,2-dimethoxy-1,2-diphenylethane-1-one or benzil dimethyl ketal, available from Ciba Geigy, Basel, Switzerland) was added in the amount of 0.5 parts by weight, in addition to the 100 parts by weight of all polymerizable components, to make a clear solution or pre-PSA composition. Two sheets of a heat-sealable 0.0635 mm (2.5 mil) thick ethylene vinyl acetate (EVA) film having 6% vinyl acetate (VA24 from Consolidated Thermoplastics Co. of Schaumberg, Ill., USA) were heat sealed on the lateral edges and the bottom to form a long rectangular pouch measuring 10 cm (4 inches) in width using a liquid form, fill, and seal machine. The resulting pouch was then filled with the pre-PSA composition. The filled pouch was then heat sealed at the top in the cross direction, through the composition, to form individual smaller pouches measuring 10 cm by 4.6 cm by about 0.4 cm thick containing ca. 20.4 grams of the composition. The pouches were placed in a water bath maintained at about 15° C. and exposed to a total of about 3.5 mW/cm$^2$ UV radiation for 8.33 minutes to effect polymerization. The radiation was supplied from lamps having about 90% of the emissions between 300 and 400 nanometers (nm), and a peak emission at 351 nm. Table 1 shows the chemical composition of the resulting PSA composition.

TABLE 1

| Example | Monomer 1, parts by wt | Monomer 2, parts by wt | Blocked Isocyanate, parts by wt |
| --- | --- | --- | --- |
| 1 | IOA, 93.60 | AA, 4.93 | I, 1.47 |

IOA Isooctyl acrylate
AA Acrylic acid

Melt Processing of the Polymer Composition

The pouches thus prepared were fed into a twin-screw extruder (screw diameter=2.5 cm, L/D=44/1, available as Model ZSK 25 from Werner-Pfleiderer GmbH, Stuttgart, Germany). A rotary rod die was fitted to the end of the extruder. The extruder barrel was held at a temperature of 150° C. An extruded PSA sheet exited the rotary rod die onto a siliconized paper liner, backed up by a chilled stainless steel roll. The PSA layer thus produced had a thickness of ca. 90 microns. There was no noticeable build-up of gel at the die, and the resulting coatings were smooth and regular.

Deblocking and Crosslinking

The coated web was placed in a forced air oven at 200° C. for 5 minutes to effect deblocking and crosslinking.

Test Measurements

23° C. static shear, 180° peel adhesion from stainless steel, and the gel content of the composition were evaluated at each of three stages: before melt processing, after melt processing, and after oven heating to effect deblocking and crosslinking. The test results are shown in Table 2.

No improvement in static shear was noted as a result of extrusion, however, and there was no change in adhesion. These experiments showed that the polymer composition could be melt-processed with an extruder without significant deblocking and crosslinking of the composition.

TABLE 2

| Example 1 | Before Melt-Processing | After Melt Processing at 150° C. | After Crosslinking in an Oven at 200° C. |
|---|---|---|---|
| Static Shear, 500 g (min) | 20 | 15 | ca. 4000 |
| 180° Peel (N/cm) | 5 | 5 | 3 |
| Gel, % | 3.9 | 12.4 | 88.5 |

Examples 2–4

A polymer composition was prepared by a two-step solventless polymerization method. Monomers, copolymerizable blocked isocyanate, and photoinitiator (0.1 parts by weight in addition to 100 parts copolymerizable components) were combined and first subjected to a partial polymerization to about 4% conversion using UV radiation to form a syrup having a coatable viscosity of about 2 Pascal-seconds (Pa·s) (2,000 cps). Additional photoinitiator (0.5 parts by weight) was then added to the syrup, and the syrup was mixed well. The syrup was then coated between two transparent siliconized polyester films (liners) at a thickness of about 1000 microns (0.1 mm) and polymerized to completion using UV radiation. The radiation was supplied from lamps having about 90% of the emission between 300 nm and 400 nm, with a peak emission at 351 nm. The UV radiation employed to effect the main polymerization had a total energy of about 1,300 mJ/cm$^2$. The compositions utilized are summarized in Table 3.

TABLE 3

| Example | Monomer 1, parts by wt | Monomer 2, parts by wt | Blocked Isocyanate I, parts by wt |
|---|---|---|---|
| 2 | IOA, 94.06 | AA, 4.95 | 0.99 |
| 3 | IOA, 93.60 | AA, 4.93 | 1.47 |
| 4 | IOA, 92.23 | AA, 4.85 | 2.92 |

AA Acrylic acid
IOA Isooctylacrylate

The resulting adhesive layers of Examples 2–4 (between two liners) were then subjected to various heat treatments by placing samples of adhesive in an aluminum pan and heating in a forced air oven. A heat treatment of twenty minutes at 160° C. simulated those temperatures to be reasonably expected during melt processing. A heat treatment for twenty minutes at 200° C. simulated crosslinking conditions. The properties measured after various heat treatments are shown in Table 4 below.

TABLE 4

| Ex. | Heat Treatment Conditions | Process Step Simulated | Gel, % |
|---|---|---|---|
| 2 | None | | 6.5 |
| 2 | 20 min, 160° C. | Melt processing | 6.1 |
| 2 | 20 min, 200° C. | Crosslinking | 66.9 |
| 2 | 20 min, 250° C. | Crosslinking | 94.1 |
| 3 | None | | 3.2 |
| 3 | 20 min, 160° C. | Melt processing | 2.3 |
| 3 | 20 min, 200° C. | Crosslinking | 70.3 |
| 3 | 5 min, 200° C. | Crosslinking | 38.2 |
| 3 | 20 min, 250° C. | Crosslinking | 81.1 |

TABLE 4-continued

| Ex. | Heat Treatment Conditions | Process Step Simulated | Gel, % |
|---|---|---|---|
| 3 | 5 min, 250° C. | Crosslinking | 58.3 |
| 3 | 3 min, 250° C. | Crosslinking | 41.2 |
| 4 | None | | 7.7 |
| 4 | 20 min, 160° C. | Melt processing | 30.0 |
| 4 | 20 min, 200° C. | Crosslinking | 79.7 |
| 4 | 20 min, 250° C. | Crosslinking | 89.3 |

Examples 5–7

On web polymerization was conducted essentially as in Examples 2–4 using the compositions of Table 5, including the copolymerizable isopropanol-blocked isocyanate (Isocyanate II) prepared as described above.

TABLE 5

| Example | Monomer 1, parts by wt | Monomer 2, parts by wt | Blocked Isocyanate II, parts by wt |
|---|---|---|---|
| 5 | IOA, 94.06 | AA, 4.95 | 0.99 |
| 6 | IOA, 93.60 | AA, 4.93 | 1.47 |
| 7 | IOA, 92.23 | AA, 4.85 | 2.97 |

AA Acrylic acid
IOA Isooctyl acrylate

As in Examples 2–4, Examples 5–7 were also exposed to varied heat treatments. The amount of gel present after the respective treatments, which is a direct indication of degree of deblocking and crosslinking, is shown in Table 6.

TABLE 6

| Ex. | Heat Treatment Conditions | Process Step Simulated | Gel, % |
|---|---|---|---|
| 5 | None | — | 6.9 |
| 5 | 20 min, 160° C. | Melt processing | 3.1 |
| 5 | 20 min, 200° C. | Crosslinking | 75.1 |
| 5 | 20 min, 250° C. | Crosslinking | 92.2 |
| 6 | None | — | 6.5 |
| 6 | 20 min, 160° C. | Melt processing | 4.4 |
| 6 | 20 min, 200° C. | Crosslinking | 69.1 |
| 6 | 20 min, 250° C. | Crosslinking | 81.7 |
| 7 | None | — | 6.4 |
| 7 | 20 min, 160° C. | Melt processing | 3.8 |
| 7 | 20 min, 200° C. | Crosslinking | 64.6 |
| 7 | 20 min, 250° C. | Crosslinking | 88.6 |

No increase in gel content was observed after exposing the compositions to temperatures commonly experienced during melt processing. Higher temperatures caused deblocking and crosslinking, as reflected in the substantial increase in gel content.

Examples 8–27

On-web polymerization (conducted essentially as described in Example 2) was used to prepare polymer compositions using the components and amounts thereof shown in Table 7. As in Example 2, 0.5 parts by weight photoinitiator (in addition to 100 parts by weight polymerizable components) was employed.

TABLE 7

| Ex. | IOA, parts by wt | AA, parts by wt | Blocked Isocyanate I, parts by wt | Blocked Isocyanate II, parts by wt |
|---|---|---|---|---|
| 8  | 94.92 | 4.99 | 0.09 |      |
| 9  | 94.53 | 4.98 | 0.49 |      |
| 10 | 94.34 | 4.97 | 0.69 |      |
| 11 | 93.96 | 4.95 | 1.09 |      |
| 12 | 93.60 | 4.92 | 1.48 |      |
| 13 | 94.92 | 4.99 |      | 0.09 |
| 14 | 94.53 | 4.98 |      | 0.49 |
| 15 | 94.34 | 4.97 |      | 0.69 |
| 16 | 93.96 | 4.95 |      | 1.09 |
| 17 | 93.60 | 4.92 |      | 1.48 |
| 18 | 97.84 | 2.06 | 0.10 |      |
| 19 | 97.44 | 2.05 | 0.51 |      |
| 20 | 97.23 | 2.05 | 0.72 |      |
| 21 | 96.84 | 2.04 | 1.12 |      |
| 22 | 96.45 | 2.03 | 1.52 |      |
| 23 | 97.84 | 2.06 |      | 0.10 |
| 24 | 97.44 | 2.05 |      | 0.51 |
| 25 | 97.23 | 2.05 |      | 0.72 |
| 26 | 96.84 | 2.04 |      | 1.12 |
| 27 | 96.45 | 2.03 |      | 1.52 |

AA Acrylic acid
IOA Isooctyl acrylate

Small portions of the compositions were removed from the liner and dissolved in ethyl acetate. The solutions were then coated onto a liner and dried in a forced air oven at 80° C. for 20 minutes to give a thickness of 70 microns dry adhesive. Each of the compositions described in Table 7 was subjected to three temperature treatments:

Treatment 1 No heat treatment beyond that experienced during polymerization and drying of the solvent-borne adhesive.

Treatment 2 Crosslinked at 200° C. for 30 minutes and then adhesively bonded to a test surface and tested, as described under Test Methods above (23° C. Static Shear and/or Shear Adhesion Failure Temperature (SAFT)).

Treatment 3 An adhesive bond was prepared by the method described under Test Methods above (23° C. Static Shear and/or Shear Adhesion Failure Temperature (SAFT)).

The resulting bonded assembly was treated at 200° C. for 30 minutes to effect crosslinking. The adhesive bond strength was then measured as described under Test Methods above (23° C. Static Shear and/or Shear Adhesion Failure Temperature (SAFT)).

The adhesive properties of the compositions were evaluated according to the test methods described above, and the results are summarized in Table 8.

TABLE 8

| Ex. | 23° C. Static Shear, 500 g (min) Treatment 1 | 23° C. Static Shear, 500 g (min) Treatment 2 | 23° C. Static Shear, 500 g (min) Treatment 3 | Shear Adh. Failure Temp. (SAFT), ° C. Treatment 2 | Shear Adh. Failure Temp. (SAFT), ° C. Treatment 3 |
|---|---|---|---|---|---|
| 8  | —  | 2600  | >10,000 | 82 | 120 |
| 9  | 78 | 2400* | >10,000 | 77 | 120 |
| 10 | 41 | 3000* | >10,000 | 62 | 120 |
| 11 | 40 | 340*  | >10,000 | 41 | 120 |
| 12 | 30 | 160*  | >10,000 | 45 | 120 |
| 13 | 78 | 2600* | >10,000 | 71 | 120 |
| 14 | 92 | 2800  | >10,000 | 33 | 120 |
| 15 | 88 | 4200* | >10,000 | 26 | 120 |
| 16 | 72 | 980*  | >10,000 | 24 | 120 |
| 17 | 72 | 640*  | >10,000 | 26 | 120 |
| 18 | 5  | 23    | 21      | 30 | 33  |
| 19 | 3  | 240   | >10,000 | 55 | 120 |
| 20 | 5  | 400   | >10,000 | 58 | 120 |
| 21 | 3  | 340   | >10,000 | 48 | 120 |
| 22 | —  | 460   | >10,000 | 62 | 120 |
| 23 | 7  | 2     | 5       | 30 | 30  |
| 24 | 2  | 2     | 4       | 30 | 32  |
| 25 | 3  | 150   | >10,000 | 48 | 120 |
| 26 | 2  | 150   | >10,000 | 55 | 120 |
| 27 | 3  | 400   | >10,000 | 61 | 120 |

* Adhesive bond failure

Example 28

The composition described in Example 12 was prepared in larger quantities via on-web polymerization essentially as described in Example 2 and then subjected to melt processing using a 15 mm twin-screw extruder (model MP-2015 bench extruder manufactured by APV Baker, Industrial Extruder Division, Newcastle-under-Lyme, United Kingdom). The extruder barrel was divided into seven controllable temperature zones, with an eighth zone comprising an end-piece or adapter that could also be varied in temperature. The composition was subjected to three different extruder temperature profiles as shown in Table 9. The temperatures given are only approximate extruder settings and do not reflect the exact, measured temperature experienced by the bulk adhesive.

Profile 1 is representative of melt processing only.

Profile 2 is representative of melt processing followed by partial crosslinking during melt processing.

Profile 3 represents melt processing followed by substantial crosslinking during melt processing.

TABLE 9

| Zone Number | Profile 1, temperature in ° C. | Profile 2, temperature in ° C. | Profile 3, temperature in ° C. |
|---|---|---|---|
| 1 | 140 | 140 | 140 |
| 2 | 140 | 140 | 140 |
| 3 | 140 | 140 | 140 |
| 4 | 140 | 140 | 140 |
| 5 | 140 | 140 | 140 |
| 6 | 140 | 140 | 160 |
| 7 | 140 | 160 | 190 |
| End-piece | 140 | 180 | 210 |

The amount of gel present after each of the three types of heat treatment was measured as an indication of the extent of thermal deblocking and crosslinking resulting from exposure to such conditions. Gel measurements were repeated after aging of the composition samples for 13 days and 28 days, respectively, to determine whether additional post-crosslinking had occurred. Significant post-crosslinking was observed in the sample that had been subjected to Profile 3. The gel measurement results are shown in Table 10.

TABLE 10

| Gel, % | Profile 1 | Profile 2 | Profile 3 |
|---|---|---|---|
| Initial | 5.0 | 8.5 | 44.9 |
| After 13 days | 7.5 | 13.3 | 51.7 |
| After 28 days | 4.1 | 10.8 | 61.5 |

Example 29

A two-liter split reaction flask was fitted with a mechanical stirrer, dropping funnel, condenser, nitrogen purge, and a thermometer. Deionized water (414 g), hydrophilic fumed silica (0.4 g, available as AEROSIL 380 from Degussa), and zinc oxide (ZnO) (Fluka) (1.36 g) were added to the flask, and the resulting mixture was dispersed by stirring and was heated to 60° C. Methacrylic acid (MAA) (10.96 g) was added to the flask in one portion. A mixture of isooctylacrylate (IOA) (264.3 g), (dimethyl m-isopropenyl benzyl) t-butyl carbamate (Isocyanate I) (3.9 g), and azo-bis-isobutyronitrile (available as VAZO 64 from Dupont)(1.36 g) was prepared separately. This mixture was then added to the heated contents of the reaction flask through the dropping funnel in one portion. The resulting mixture was stirred at medium speed (determined visually), so as to form small suspended droplets of water-insoluble monomer. The temperature of the mixture was maintained at 50° C. for 20 minutes. The exotherm that resulted from the polymerization reaction reached a maximum temperature of about 90° C. after an additional 30 minutes. The reaction temperature was maintained at 80° C. for 90 minutes to complete the polymerization. The contents of the flask were then cooled to 35° C. Then, 7.75 g of a mixture of methanol and hydrophobic fumed silica (AEROSIL 972 from Degussa) in a weight ratio of 10 to 1 was added. The resulting polymer beads were finally separated from the polymerization medium using vacuum-assisted filtration and then washed with 20 g methanol. The polymer composition of the suspension beads is shown in Table 11.

TABLE 11

| Example | Monomer 1, parts by wt | Monomer 2, parts by wt | Blocked Isocyanate I, parts by wt |
|---|---|---|---|
| 29 | IOA, 93.60 | MAA, 4.92 | 1.48 |

MAA Methacrylic acid
IOA Isooctyl acrylate

The beads were then dissolved in ethyl acetate at 30% solids and cast on a silconized liner and dried in a forced air oven. 23° C. Static Shear was measured on the resulting uncrosslinked adhesive film. Then an adhesive bond was made, and, after the adhesive bond was created, the adhesive film was crosslinked. The strength of the resulting adhesive bond was measured by both the 23° C. Static Shear test (1 kg weight) and the Shear Adhesion Failure Temperature (SAFT) test. The results are shown in Table 12.

TABLE 12

| Example | 23° C. Static Shear, 1 kg (min) Before Crosslinking | 23° C. Static Shear, 1 kg (min) After Bonding and Crosslinking | Shear Adhesion Failure Temperature (SAFT), ° C. After Bonding and Crosslinking |
|---|---|---|---|
| 29 | 2165 | >10,000 min | >120° C. |

Examples 30 and 31

A polymer was prepared essentially by the on-web polymerization method of Example 2. The polymer comprised polymerized units derived from isooctyl acrylate (IOA), isobornyl acrylate (IBA), and copolymerizable blocked Isocyanate I and was prepared by photopolymerization employing 0.5 parts by weight Irgacure™ 651 photoinitiator. No isocyanate-reactive comonomer was included.

In Example 30, the polymer thus prepared was dissolved in ethyl acetate and then mixed with 0.5 parts by weight of ε-caprolactone-based triol having a number average molecular weight of 300 and a hydroxyl number of 560 (available as TONE 301 from Union Carbide, Danbury, CT/USA), a multifunctional, isocyanate-reactive crosslinking agent. The resulting mixture was then cast and dried on a liner to form a pressure-sensitive adhesive film, which was then tested according to the test methods described above.

In Example 31, the IOA/IBA copolymer was dissolved in ethyl acetate and combined with 1.5 parts of an aspartic ester amine (as a multifunctional, isocyanate-reactive crosslinking agent), specifically N,N'-(3,3-dimethyldicyclohexylmethane-4,4'-diyl)-bis-tetraethyl aspartic ester, available as Desmophen™ VP-LS 2973 from Bayer AG, Leverkusen, Germany. The mixture was then cast and dried on a liner to form a pressure-sensitive adhesive film, which was then tested according to the test methods described above.

Table 13 shows the chemical compositions of Examples 30 and 31.

TABLE 13

| Ex. | Monomer 1, parts by wt | Monomer 2, parts by wt | Blocked Isocyanate I, parts by wt | Cross-linking Agent | Amount of Cross-linking Agent, parts by wt |
|---|---|---|---|---|---|
| 30 | IOA, 93.60 | IBA, 4.93 | 1.47 | Tone ™ 301 | 0.5 |
| 31 | IOA, 93.60 | IBA, 4.93 | 1.47 | Aspartic ester amine | 1.5 |

IOA Isooctyl acrylate
IBA Isobornyl acrylate
Tone ™ 301:
ε-Caprolactone-based triol having a number average molecular weight of 300 and a hydroxyl number of 560 (available as TONE 301 from Union Carbide, Danbury, CT/USA)
Aspartic ester amine:
N,N'-(3,3-dimethyldicyclohexylmethane-4,4'-diyl)-bis-tetraethyl aspartic ester (available as Desmophen ™ VP-LS 2973 from Bayer AG, Leverkusen, Germany)

Table 14 summarizes the measured pressure-sensitive adhesive properties of the compositions, both before crosslinking (23° C. Static Shear and Shear Adhesion Failure Temperature (SAFT)) and after adhesive bonding with subsequent crosslinking (23° C. Static Shear and Shear Adhesion Failure Temperature (SAFT)).

TABLE 14

| Example | 23° C. Static Shear, 1 kg (min) Before Crosslinking | Shear Adhesion Failure Temp. (SAFT), ° C. Before Crosslinking | 23° C. Static Shear, 1 kg (min) After Bonding and Crosslinking | Shear Adhesion Failure Temp. (SAFT), ° C. After Bonding and Crosslinking |
| --- | --- | --- | --- | --- |
| 30 | 12 | 30 | >4,000 | 70 |
| 31 | 8 | 30 | >4,000 | 85 |

Comparative Example 1

Example 2 was repeated with the exception that the copolymerizable blocked Isocyanate I was omitted. The composition is summarized in Table 15. This composition had no inherent crosslinking capacity, and thus its properties (Table 16) reflect those of the uncrosslinked base polymer.

Comparative Example 2

The IOA/AA copolymer (100 parts by weight) prepared as described in Comparative Example 1 was combined with $H_{12}MDI$ (fully-hydrogenated m-toluene diisocyanate), which had been doubly blocked with methylethylketoxime to form a non-copolymerizable, blocked isocyanate (5 parts by weight in addition to 100 parts IOA and AA), and DBU-phenolate (0.1 parts) as a catalyst. The blocked $H_{12}MDI$ was prepared by using an excess of methyethylketoxime in a manner essentially the same as that employed for the preparation of Isocyanate VI. The resulting mixture was then dissolved in ethyl acetate and cast and dried on a liner to form a pressure-sensitive adhesive film which was then tested according to the test methods described above. The Shear Adhesion Failure Temperature (SAFT) of Comparative Example 2 was the same as that of Comparative Example 1. For comparative purposes, the compositions and properties of Comparative Examples 1 and 2 are summarized along with Example 12 in Tables 15 and 16.

TABLE 15

| Ex. | Monomer 1 (type, parts by wt) | Monomer 2 (type, parts by wt) | Blocked Isocyanate (type, parts by wt) | Catalyst (type, parts by wt) |
| --- | --- | --- | --- | --- |
| C1 | IOA, 95 | AA, 5 | None | None |
| C2 | IOA, 95 | AA, 5 | Blocked $H_{12}MDI$, 5 | DBU-phenolate, 0.1 |
| 12 | IOA, 93.60 | AA, 4.92 | Isocyanate I, 1.48 | None |

IOA Isooctyl acrylate
AA Acrylic acid

TABLE 16

| Ex. | 23° C. Static Shear, 1 kg (min) Before Crosslinking | 23° C. Static Shear, 1 kg (min) After Bonding and Crosslinking | Shear Adhesion Failure Temperature (SAFT), ° C. After Bonding and Crosslinking |
| --- | --- | --- | --- |
| C1 | 16 | n.a. | 30 |
| C2 | n.a. | 1433 | 30 |
| 12 | 12 | 6,000 | 120 |

Comparative Example 3

The suspension bead polymerization of Example 29 was essentially repeated, with the exception that Isocyanate I was omitted. The resulting dried bead polymer was then dissolved in ethyl acetate and cast and dried on a liner to form a pressure-sensitive adhesive film, which was then tested according to the test methods described above. The resulting polymer of Comparative Example 3, like that of Comparative Example 1, had no inherent crosslinking capacity and its properties (Table 18) reflect that of the uncrosslinked base polymer. The Shear Adhesion Failure Temperature (SAFT) was measured as 98° C.

Comparative Example 4

The suspension bead polymer of Comparative Example 3 was combined with $H_{12}MDI$ (fully-hydrogenated m-toluene diisocyanate), which had been doubly blocked with methylethylketoxime (5 parts), and 1,8-diaza-bicyclo(5,4,0) undecene-7-phenolate (abbreviated as DBU-phenolate) (0.1 parts) as a catalyst. The resulting mixture was dissolved in ethyl acetate and cast to give a pressure-sensitive adhesive film. An adhesive bond was made, and then crosslinking of the bonded adhesive film was effected by applying heat for 30 minutes at 200° C., as described under Treatment 3 in Examples 8–27. After crosslinking, two adhesive properties were measured as shown in Table 18 (in comparison with the properties of the composition of Example 29). The Shear Adhesion Failure Temperature (SAFT) was measured to be 78° C., considerably lower than that of Comparative Example 3 where no crosslinking occurred.

TABLE 17

| Ex. | Monomer 1, parts by wt | Monomer 2, parts by wt | Initiator, parts by wt | Blocked Isocyanate, parts by wt | Catalyst, parts by wt |
| --- | --- | --- | --- | --- | --- |
| C3 | IOA, 95 | MAA, 5 | VAZO 64, 0.5 | None | None |
| C4 | IOA, 95 | MAA, 5 | VAZO 64, 0.5 | Blocked $H_{12}MDI$, 5 | DBU-phenolate, 0.1 |
| 29 | IOA, 93.60 | MAA, 4.92 | VAZO 64, 0.5 | Isocyanate I, 1.48 | None |

IOA Isooctyl acrylate
MAA Methacrylic acid

TABLE 18

| Example | 23° C. Static Shear, 1 kg (min) Before Crosslinking | 23° C. Static Shear, 1 kg (min) After Bonding and Crosslinking | Shear Adhesion Failure Temperature (SAFT), ° C. After Bonding and Crosslinking |
| --- | --- | --- | --- |
| C3 | 2165 | n.a. | 98 |
| C4 | n.a. | 210 | 72 |
| 29 | 2165 | >10,000 | >120 |

Examples 32–38

Figure 1:
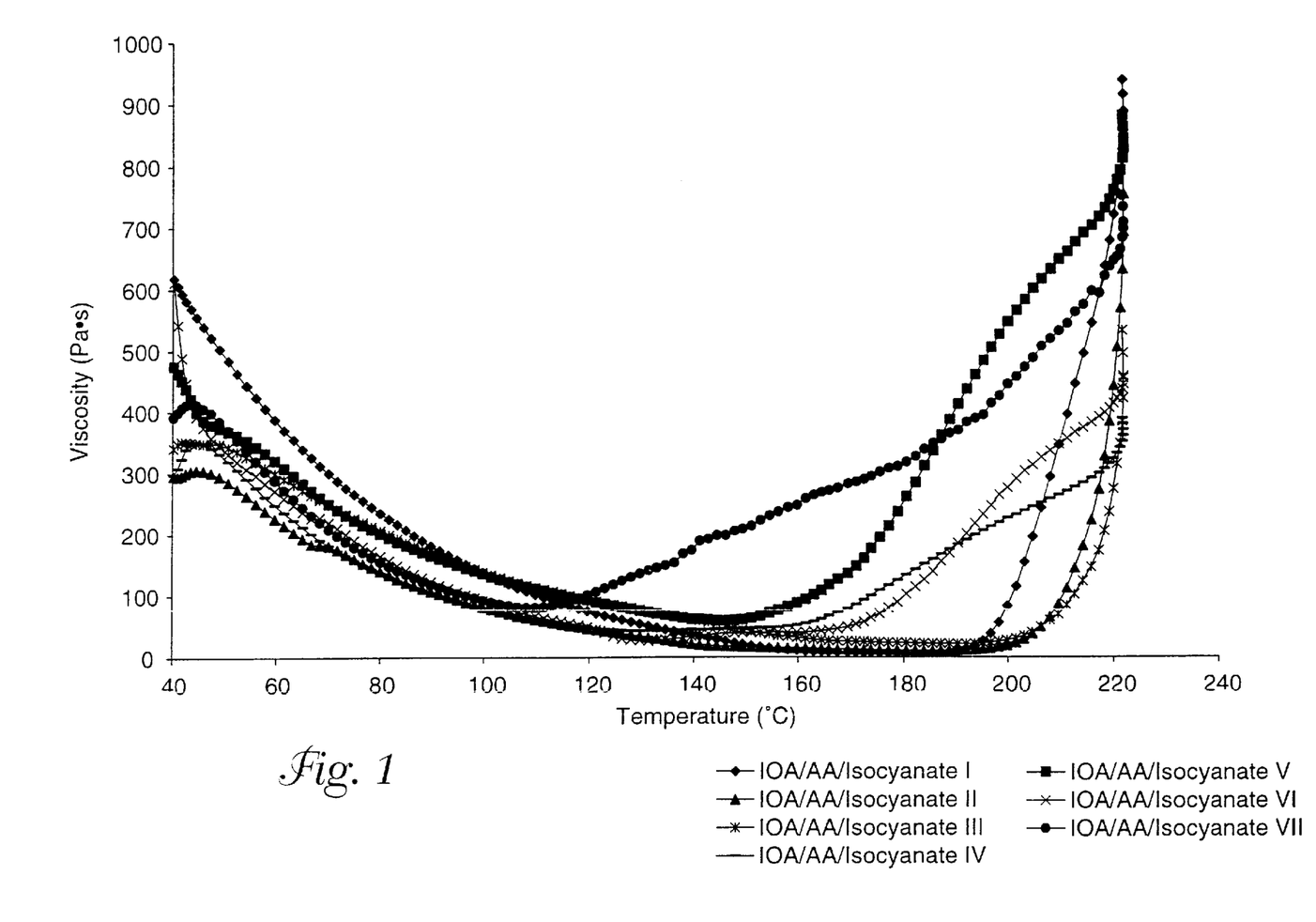
FIG. 1 is a plot of viscosity (as an indicator of crosslinking) versus temperature for a series of polymer compositions described in Examples 32–38, infra. The compositions comprise polymerized units derived from a series of blocked isocyanates prepared using different blocking agents.

Polymer compositions were prepared using essentially the on-web polymerization method described in Example 2, by combining 93.60 parts by weight isooctyl acrylate, 4.93 parts by weight of acrylic acid, 0.5 parts by weight photoinitiator, and 1.47 parts by weight, respectively, of each of the copolymerizable blocked Isocyanates I–VII, and then polymerizing using UV light to form seven different polymer compositions. The polymer compositions were formed as pressure-sensitive adhesive films on a liner and had a thickness of 1.5 to 2.0 mm. Circular samples of the films were prepared using a die. The circular samples were evaluated using the above-described methods of determining "Onset of Crosslinking" (° C.) and "Rate of Crosslinking," which involved the plotting of viscosity versus temperature for each of the samples, as shown in FIG. 1. The results of the evaluations are summarized in Table 19. Boiling point (° C.) in Column 4 of Table 19 indicates the boiling point of the blocking agent (which is liberated upon deblocking).

TABLE 19

| Ex. | Iso-cyanate | Blocking Agent | Boiling Point (° C.) | Onset of Cross-linking (° C.)* | Rate of Cross-linking** (Pa.s/° C.) |
|---|---|---|---|---|---|
| 32 | I | t-butanol | 82.5 | 198 | 145 |
| 33 | II | isopropanol | 82.4 | 216 | 160 |
| 34 | III | n-butanol | 117–118 | 213 | 5.3 |
| 35 | IV | n-hydroxy succinimide | >200(dec.) | 150 | 4.4 |
| 36 | V | ε-caprolactam | 268.5 | 160 | 15.3 |
| 37 | VI | methyl ethyl ketoxime | 170(dec.) | 169 | 8.1 |
| 38 | VII | 3,5-dimethyl-pyrazole | 218(dec.) | 100 | 4.2 |

*, **as measured for copolymers of the blocked Isocyanates I-VII with IOA and AA Various modifications and alterations of this invention will become apparent to those skilled in the art without departing from the scope and spirit of this invention.

What is claimed is:

1. A process for crosslinking a melt-processed polymer composition comprising the steps of (a) forming a polymerizable mixture comprising (i) at least one monoethylenically-unsaturated monomer or prepolymer and (ii) at least one monoethylenically-unsaturated, blocked mono- or polyisocyanate that is thermally stable at a selected melt processing temperature range and that is thermally deblockable at and above a deblocking temperature that is at least about 10° C. above the maximum temperature (in ° C.) of said selected melt processing temperature range; (b) exposing said polymerizable mixture to transmissive energy to polymerize said mixture to form a polymer composition comprising polymerized units derived from said blocked mono- or polyisocyanate; (c) melt processing said polymer composition at said selected melt processing temperature rang to form a melt-processed polymer composition; and (d) during melt processing or thereafter, increasing the temperature of said melt-processed polymer composition to said deblocking temperature, in the presence of at least one isocyanate-reactive crosslinking agent, to effect crosslinking of said melt-processed polymer composition.

2. The process of claim 1 wherein said blocked mono- or polyisocyanate, upon deblocking, releases at least one compound having a boiling point below said deblocking temperature.

3. The process of claim 1 wherein said monoethylenically-unsaturated monomer is an acrylic or methacrylic ester of a non-tertiary alkyl alcohol, said alkyl moiety having from 1 to about 20 carbon atoms.

4. The process of claim 1 wherein said monoethylenically-unsaturated, blocked mono- or polyisocyanate is prepared by the reaction of a monoethylenically-unsaturated, organic mono- or polyisocyanate with a blocking agent selected from the group consisting of phenols, lactams, oximes, imides, alcohols, pyrazoles, and mixtures thereof.

5. The process of claim 4 wherein said monoethylenically-unsaturated, organic mono- or polyisocyanate comprises an acryloyl, methacryloyl, styryl, or α-methylstyryl moiety.

6. The process of claim 4 wherein said blocking agent is selected from the group consisting of phenols, oximes, and alcohols.

7. The process of claim 6 wherein said blocking agent is an alcohol.

8. The process of claim 1 wherein said boiling point is at least about 50° C. below said deblocking temperature (in ° C.).

9. The process of claim 1 further comprising the step of enclosing said polymerizable mixture in packaging material prior to polymerization of said polymerizable mixture.

10. The process of claim 1 wherein said isocyanate-reactive crosslinking agent is a monoethylenically-unsaturated monomer comprising at least one isocyanate-reactive group.

11. The process of claim 1 wherein said isocyanate-reactive crosslinking agent comprises at least two isocyanate-reactive groups and is not capable of copolymerization with said monomer or prepolymer and said blocked mono- or polyisocyanate.

12. A process for crosslinking a melt-processed polymer composition comprising the steps of (a) forming a polymerizable mixture comprising (i) at least one acrylic or methacrylic ester of a non-tertiary alkyl alcohol, said alkyl moiety having from 1 to about 20 carbon atoms, or at least one prepolymer derived from at least one said ester and (ii) at least one monoethylenically-unsaturated, blocked mono- or polyisocyanate that is thermally stable at a selected melt processing temperature range, that is thermally deblockable at and above a deblocking temperature that is at least about 10° C. above the maximum temperature (in ° C.) of said selected melt processing temperature range, and that, upon deblocking, releases at least one compound having a boiling point below said deblocking temperature, said blocked mono- or polyisocyanate being prepared by the reaction of an alcohol with an organic mono- or polyisocyanate comprising an acryloyl, methacryloyl, styryl, or α-methylstyryl moiety; (b) exposing said polymerizable mixture to transmissive energy to polymerize said mixture to form a polymer composition comprising polymerized units derived from said blocked mono- or polyisocyanate; (c) melt processing said polymer composition at said selected melt processing temperature range to form a melt-processed polymer composition; and (d) during melt processing or thereafter, increasing the temperature of said melt-processed polymer composition to said deblocking temperature, in the presence of at least one isocyanate-reactive crosslinking agent, to effect crosslinking of said melt-processed polymer composition.

13. The process of claim 12 further comprising the step of enclosing said polymerizable mixture in packaging material prior to polymerization of said polymerizable mixture.

14. The process of claim 12 wherein said organic mono- or polyisocyanate comprises a styryl or α-methylstyryl moiety and said alcohol is an alkanol.

15. A pre-PSA composition comprising (a) at least one acrylic or methacrylic ester of a non-tertiary alkyl alcohol, said alkyl group having from 1 to about 20 carbon atoms; (b) at least one monoethylenically-unsaturated, blocked mono- or polyisocyanate that is thermally stable at a selected melt processing temperature range and that is thermally deblockable at and above a deblocking temperature that is at least about 10° C. above the maximum temperature (in ° C.) of said selected melt processing temperature range; and (c) at least one isocyanate-reactive crosslinking agent.

16. The composition of claim 15 wherein said blocked mono- or polyisocyanate, upon deblocking, releases at least one compound having a boiling point below said deblocking temperature.

17. The composition of claim 15 wherein said monoethylenically-unsaturated, blocked mono- or polyisocyanate is prepared by the reaction of a monoethylenically-unsaturated, organic mono- or polyisocyanate with a blocking agent selected from the group consisting of phenols, lactams, oximes, imides, alcohols, pyrazoles, and mixtures thereof.

18. The composition of claim 17 wherein said monoethylenically-unsaturated, organic mono- or polyisocyanate comprises an acryloyl, methacryloyl, styryl, or α-methylstyryl moiety.

19. The composition of claim 17 wherein said blocking agent is selected from the group consisting of phenols, oximes, and alcohols.

20. The composition of claim 19 wherein said blocking agent is an alcohol.

21. The composition of claim 15 wherein said deblocking temperature is at least about 10° C. above the maximum temperature (in ° C.) of said selected melt processing temperature range.

22. The composition of claim 15 wherein said boiling point is at least about 50° C. below said deblocking temperature (in ° C.).

23. The composition of claim 15 wherein said isocyanate-reactive crosslinking agent is a monoethylenically-unsaturated monomer comprising at least one isocyanate-reactive group.

24. The composition of claim 15 wherein said isocyanate-reactive crosslinking agent comprises at least two isocyanate-reactive groups and is not capable of copolymerization with said acrylic or methacrylic ester and said blocked mono- or polyisocyanate.

25. A pre-PSA composition comprising (a) at least one acrylic or methacrylic ester of a non-tertiary alkyl alcohol, said alkyl group having from 3 to about 18 carbon atoms; (b) at least one monoethylenically-unsaturated, blocked mono- or polyisocyanate that is thermally stable at a selected melt processing temperature range, that is thermally deblockable at and above a deblocking temperature that is at least about 10° C. above the maximum temperature (in ° C.) of said selected melt processing temperature range, and that, upon deblocking, releases at least one compound having a boiling point below said deblocking temperature, said blocked mono- or polyisocyanate being prepared by the reaction of an alcohol with an organic mono- or polyisocyanate comprising an acryloyl, methacryloyl, styryl, or α-methylstyryl moiety; and (c) at least one isocyanate-reactive crosslinking agent.

26. The composition of claim 25 wherein said organic mono- or polyisocyanate comprises a styryl or α-methylstyryl moiety and said alcohol is an alkanol.

27. A composition prepared by the process of claim 1.

28. A composition prepared by the process of claim 9.

29. A PSA composition prepared from the pre-PSA composition of claim 16.

30. An article comprising the composition of claim 27.

31. An article comprising the composition of claim 28.

32. An article comprising the PSA composition of claim 29.

* * * * *